US007635834B2

(12) United States Patent
Augstein et al.

(10) Patent No.: US 7,635,834 B2
(45) Date of Patent: Dec. 22, 2009

(54) SYSTEM AND METHOD FOR OPTICALLY IMAGING OBJECTS ON A DETECTION DEVICE BY A PINHOLE APERTURE

(75) Inventors: Manfred Augstein, Mannhein (DE); Joerg Dreibholz, Altrip (DE); Dieter Falk, Radoltzell/Guettingen (DE); Uwe Kass, Wattenheim (DE); Heinz Macho, Fuerth (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 0 days.

(21) Appl. No.: 11/772,942

(22) Filed: Jul. 3, 2007

(65) Prior Publication Data
US 2008/0121789 A1     May 29, 2008

Related U.S. Application Data

(63) Continuation of application No. PCT/EP2006/000424, filed on Jan. 19, 2006.

(30) Foreign Application Priority Data
Jan. 21, 2005    (DE)   ....................... 10 2005 002 934

(51) Int. Cl.
    *H01L 27/00*      (2006.01)
(52) U.S. Cl. ..................................... 250/208.1; 250/216
(58) Field of Classification Search ................. 250/216, 250/208.1; 235/462.42; 348/222.1, 335, 348/360, 376; 396/29
See application file for complete search history.

(56) References Cited

U.S. PATENT DOCUMENTS 4,506,152 A * 3/1985 Gupta ........................ 250/216

(Continued)

FOREIGN PATENT DOCUMENTS

CA      2559195 A1    9/2005

(Continued)

OTHER PUBLICATIONS

Product information for Microscan Quadrus EZ Technology for Data Tracking, http://www.quadrus-ez.com/products/quadrusez.htm.

(Continued)

*Primary Examiner*—Que T Le
(74) *Attorney, Agent, or Firm*—Roche Diagnostics Operations, Inc.

(57) ABSTRACT

Systems and method for optically imaging objects and in particular optical patterns or codes onto a detection device by a pinhole aperture are described. According to an embodiment of the invention these systems have optical attenuation elements between the illumination devices and the object which substantially compensate the system-inherent imaging detects caused by the pinhole aperture and in particular the system-inherent peripheral decrease in brightness of an image of the object formed by a pinhole aperture on the detection device. According to an embodiment of the invention, the optical attenuation elements change the illumination intensity of the object in such a manner that the central areas of the object are illuminated at a lower light intensity than its peripheral areas. As a result of the subsequent imaging of the object by a pinhole aperture, the central areas of the object are imaged onto the detection device at a higher light intensity than the peripheral areas of the object. The superimposition of the two effects enables the imaging system according to the invention to achieve a substantially uniform system-inherent brightness distribution on the detection device.

21 Claims, 5 Drawing Sheets

U.S. PATENT DOCUMENTS

| | | | |
|---|---|---|---|
| 4,510,383 A | 4/1985 | Ruppender | |
| 4,810,084 A | 3/1989 | Nyui | |
| 5,280,161 A * | 1/1994 | Niwa | 235/462.42 |
| 5,486,688 A | 1/1996 | Iima et al. | |
| 5,504,317 A * | 4/1996 | Takahashi | 235/462.42 |
| 5,621,203 A * | 4/1997 | Swartz et al. | 235/462.11 |
| 6,249,368 B1 * | 6/2001 | Hsu | 359/212 |
| 2005/0117336 A1 * | 6/2005 | Jenny | 362/232 |

FOREIGN PATENT DOCUMENTS

| | | |
|---|---|---|
| DE | 4305058 A1 | 8/1994 |
| EP | 372447 A1 * | 6/1990 |
| JP | 07167788 | 7/1995 |
| JP | 2004240824 | 8/2004 |
| WO | 8400620 A1 | 2/1984 |

OTHER PUBLICATIONS

Product information for Microscan QuadrusEZ: Vollintegrierter 2D-Code-Leser.

* cited by examiner

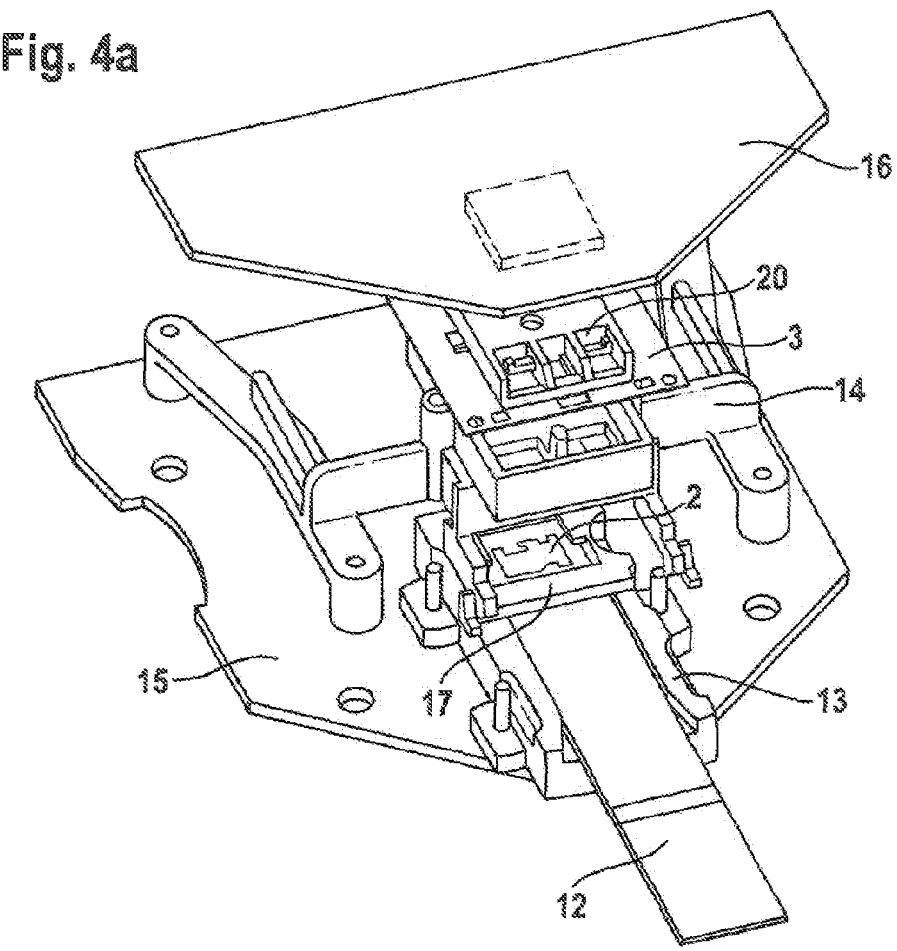
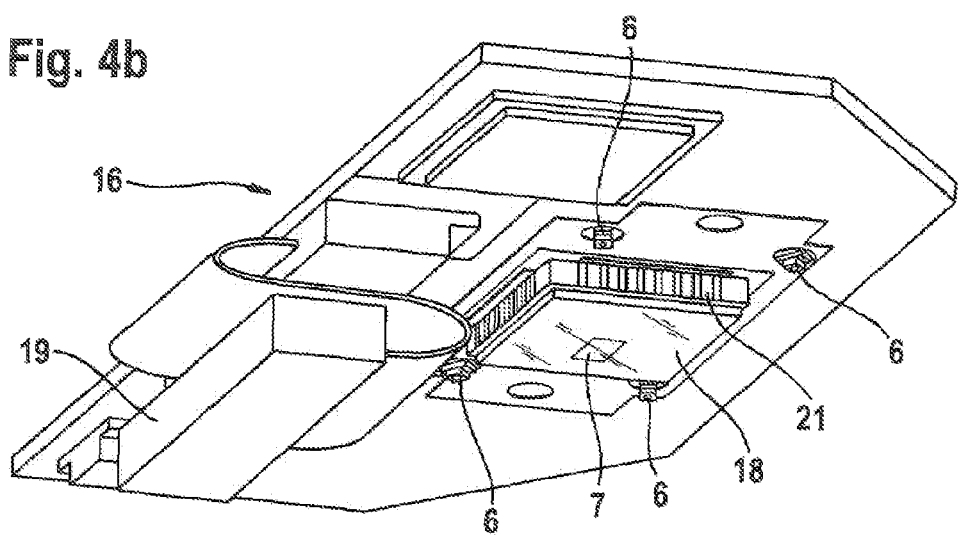

SYSTEM AND METHOD FOR OPTICALLY IMAGING OBJECTS ON A DETECTION DEVICE BY A PINHOLE APERTURE

BACKGROUND OF THE INVENTION

The invention concerns systems for optically imaging objects, in particular information-carrying optical patterns of codes, on a detection device and in particular on a CCD or CMOS element with the aid of a pinhole aperture. The invention especially concerns systems that have devices which substantially compensate the imaging defects caused by the pinhole aperture and in particular the system-inherent peripheral decrease in brightness of an image of the object formed by a pinhole aperture on the detection device.

In addition the invention concerns systems for capturing optical information which comprise such a system for optically imaging an object that carries optical information and an in-line evaluation device which collects the optical information of the object from the image of the object, formed on the detector device and provides this information for further processing or display.

In addition, the invention concerns test element analytical systems comprising at least one test element and an evaluation device which contain such systems according to the invention for collecting optical information.

Finally, the invention concerns methods for optically imaging objects on a detection device by a pinhole aperture which can substantially compensate the imaging defects caused by the pinhole aperture and in particular the system-inherent peripheral decrease in brightness of an image of the object formed by a pinhole aperture on the detection device.

The optical imaging of objects on detection devices plays a major role in many technical fields. Thus the optical imaging of one-dimensional or two-dimensional optical patterns on detection devices that are usually in special reading systems such as code readers or scanners, is used to collect information, on the objects which carry these optical patterns and to transfer the information to an in-line evaluation system.

Optical patterns which are often used to store or transfer information are for example one-dimensional (1D, for example barcodes) or two-dimensional (2D, for example data matrix codes) codes which are applied to objects, for example printed onto or glued onto objects and contain, information on this object. In this case the information is coded in the optical pattern of the code. An image thereof is formed on a detection device which firstly records the image of the pattern. Subsequently the information of the imaged object can be collected therefrom and provided for further pressing or display. Thus, for example, structural units, individual components, intermediate and also final products can be unequivocally identified and controlled with such a code which, among others, enables a control of production and storage and a traceability of products if errors should occur. Typical fields of application of such codes are storage and materials-handling technology, quality assurance, material monitoring, production control, sample identification in pharmaceutics and the health system, in the automobile industry, in chemical and biomedical analyzers and for document handling.

Such optical systems are also used to record optical patterns especially in chemical and diagnostic analytical systems and especially in test element analytical systems. In such test element analytical systems optical codes which are on the respective test element or on an object that is specialty provided for this purpose such as a batch-specific coding object, are used primarily to deliver specific information to the evaluation device on the test that is being used in each case and/or the special test element. Such test element analytical systems are described for example in the German Patent Application with the file number 102004011648.2.

The optical reading systems, used in industrial applications usually employ lens optics in reflection optical methods which form an image of the optical pattern on a detection device. Other designs are for example realized in scanners which use partially transparent optical patterns or codes in a transmission process. Whereas, one-dimensional codes can usually be recorded relatively simply by employing line sensors or scanners that move relatively to the code-carrying object, two-dimensional optical patterns such as 2D codes are firstly imaged on a detection, device and these images are subsequently evaluated, usually by special software algorithms. Such reading systems for two-dimensional-optical patterns usually employ optical matrix sensors such as CCD or CMOS sensors, as detection devices.

For a good imaging quality of the imaging system it is important that these systems have imaging properties that result in a substantially uniform system-inherent brightness distribution in the detection plane. In this connection the term system-inherent brightness distribution in the detection plane is understood to mean that it refers to the brightness distribution of the image of a uniform object and in particular a homogeneous and especially uniformally structured and uniformly colored surface on a detection device which is located in the detection plane. Such a brightness distribution allows information to be obtained on the fundamental imaging properties of the optical system. An image of such a uniform object can be regarded as a type of background image which represents the system-inherent imaging properties including its system-inherent imaging defects. An object that is to be imaged which carries information must be distinguishable from such a system-inherent background image for example in the form of defined areas of a different brightness or color. If a system-inherent background image already results in appreciable differences in brightness in the detection plane, these system-inherent differences in brightness would be superimposed on the differences in brightness that are due to the actual information-carrying object that is to be imaged and are desired and necessary for information transfer, for example in the form of areas that are too light or dark. This would considerably complicate, falsify or prevent the acquisition and evaluation of the true information to be transferred.

Various solutions have been proposed in the prior art to achieve the most homogeneous system-inherent brightness distribution, in the detection plane:

Thus, for examples the 2D code reader "Quadras" from the Microsan Company (Freising, Germany) has 20 individual high-performance LEDs as light sources to illuminate the object as homogeneously as possible.

The German laid-open document DE 4221069 describes an optical device for imaging optical patterns such as a barcode that are imaged on a photosensor. The optical device comprises an imaging lens to image the barcode and a CCD line sensor to record and evaluate the information of the image of the barcode. The system also has an attenuation device that is arranged between the barcode and the line sensor and is designed such that the system-inherent brightness distribution on the sensor becomes more uniform despite the construction-related influence by the imaging lens. In this connection DE 4221069 reaches attenuation elements which comprise an optical element which is able to attenuate the intensity of certain spatial areas of a light beam that impinges on the line sensor after being emitted from the object to be imaged. In this connection DE 4221069 teaches in particular mirror elements that are provided with a coating which, has a lower refractive index in the central area than in the periphery and are thus suitable as attenuation dements according to the invention. Furthermore, DE 4221069 teaches ND (neutral density) filters as attenuation elements with a lower transmission factor in the central area than in the periphery which can be used as light attenuating filters in the optical path between the code to be imaged and the detection device.

Other factors have to be taken into consideration for an application of imaging systems especially in mobile instruments or hand-held systems such as hand scanners or portable test element analytical systems:

Since such systems are often manufactured in large numbers it is advantageous to integrate imaging systems that are as simple and cheap as possible into these systems or instruments. They must nevertheless fulfil certain requirements with regard to the imaging quality in order to ensure the optical information which is contained in the objects to be imaged is accurately recorded and evaluated.

Many of the conventional systems which employ a scanning movement relative to the object to be imaged have a relatively large constructed space which, among others, is due to their lens systems and the devices that control the movement of the object relative to the detection device. Since especially test element analytical systems are often designed as portable hand-held instruments, it is desirable that such systems have the smallest possible constructional size that should be in the range of a few cubic centimeters.

Simple and cheap imaging systems usually employ a transmission method which means that the object to be imaged is irradiated by a light source and imaged on a detection device which is located on the side opposite to the light source. It is inherent to the system that such systems require a large constructional space since the light source, object to be imaged and detection device have to be arranged one behind the other and they are therefore only of limited suitability for use in portable systems. Moreover, the object to he imaged must have certain optical properties in order for such transmission methods to be used at all. Thus, for example, optical codes must have at least partially transparent areas in order that their information can be read by such systems. Consequently, such imaging systems are unsuitable for many fields of application.

No systems are known from the prior art for optically imaging objects which are characterized by a combination of a very simple and cheap design, the smallest possible structural space, the ability to form an image of the object to be imaged on the detection device without a movement of the imaging system relative to the object and very reliable reading. In particular, the known imaging systems are only of limited suitability for incorporation into small and portable systems and in particular into diagnostic test element analytical systems. In particular, no simple imaging systems are known which achieve a very uniform system-inherent brightness distribution in the detection plane using simple and cost-efficient means.

SUMMARY OF THE INVENTION

It is against the above background that the present invention provides certain unobvious advantages and advancements over the prior art. In particular, the inventors have recognized a need for improvements in systems and methods for optically imaging objects on a detection device by a pinhole aperture.

Although the present invention is not limited to specific advantages or functionality, it is noted that the present invention provides systems and methods for imaging optical patterns and in particular codes which fulfil the aforementioned requirements for such imaging systems for use in portable test element analytical systems. The present invention further provides the following features and advantages:

provides a simple and cost-efficient system for optically imaging objects on a detection device in a compact design which has a system-inherent brightness distribution in the detection plane that is as uniform as possible;

provides systems for recording and processing optical information which, in addition to an imaging system, have additional devices which record the optical information of the object that are imaged on the detection device and provide this information for further processing or display;

provides test element analytical systems which comprise at least one test element which encodes information in the form of an optical pattern and at least one evaluation device which has a system for recording and processing this optical information; and provides methods for optically imaging objects on a detection device in which the system-inherent brightness distribution is ensured to be as uniform as possible in the detection plane.

In accordance with one embodiment of the present invention, a system for optically imaging an object is provided comprising a detection device located in a detection plane; a pinhole aperture to image an object located in an object plane onto the detection device; an illumination device for illuminating the object; and an optical attenuation element arranged between the illumination device and the object plane which optical attenuation element is configured to substantially compensate for system-inherent imaging defects caused by the pinhole aperture.

In accordance with another embodiment, a method for optically imaging an object is provided comprising providing an object located in an object plane; providing a detection device located in a detection plane; providing an illumination device; providing an optical attenuation element arranged between the illumination device and the object plane; illuminating the object with the illumination device; and imaging the object onto the detection device by a pinhole aperture, wherein the optical attenuation element substantially compensates for system-inherent imaging defects caused by the pinhole aperture.

These and other features and advantages of the present invention will be more fully understood from the following detailed description, of the invention taken together with the accompanying claims. It is noted that the scope of the claims is defined by the recitations therein and not by the specific discussion of features and advantages set forth in the present description.

BRIEF DESCRIPTION Of THE DRAWINGS

The following detailed, description of the embodiments of the present invention can be best understood when read in conjunction with the following drawings, where like structure is indicated with like reference numerals and in which:

FIGS. 4a and 4b show prospective views of a system according to an embodiment of the invention for recording and processing optical information which can be integrated into a diagnostic hand-held analytical system.

The numerals in the figures denote:

Figure 1:
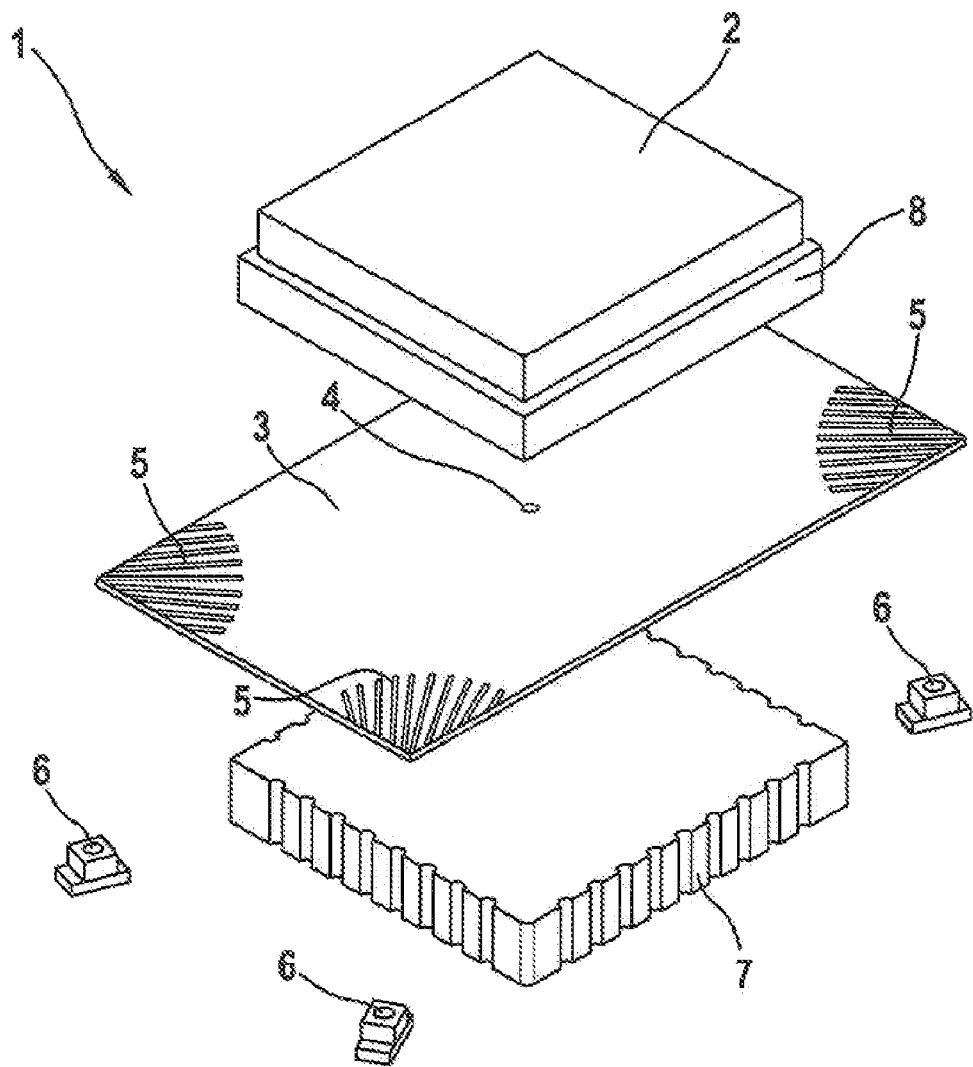
FIG. 1 shows an exemplary diagram of a system according to an embodiment of the invention for optically imaging an object.

| | |
|---|---|
| 1 | system for optical imaging |
| 2 | object |
| 3 | film mask |
| 4 | pinhole aperture |
| 5 | optical attenuation element |
| 6 | illumination device |
| 7 | detection device |
| 8 | system window (spacer) |
| 9 | punch mark |
| 10 | film mark |
| 11 | aperture structure |
| 12 | test element |
| 13 | test strip holder |
| 14 | holder |
| 15 | base plate |
| 16 | illumination and detection unit |
| 17 | strip aperture |
| 18 | cover for the detection device |
| 19 | connection for power supply/data transfer |
| 20 | film pressing means |
| 21 | housing of the detection device |

Skilled artisans appreciate that elements in the figures are illustrated for simplicity and clarity and have not necessarily been drawn to scale. For example, the dimensions of some of the elements in the figures may be exaggerated relative to other elements to help improve understanding of the embodiment(s) of the present invention.

DETAILED DESCRIPTION OF THE INVENTION

In accordance with the present invention, a system for optically imaging an object by a pinhole aperture is provided. Such an imaging system is based on the principle of the pinhole camera or camera obscura and has a pinhole aperture which is used to form an image of the object on the detection device. The principle of imaging by means of a pinhole aperture is for example explained in more detail in the "Lexikon der Optik" (Spektrum Akademischer Verlag, Heidelberg, Germany).

A major advantage of imaging systems based on the pinhole camera principle is that no lenses are required to form an image of the object. Lenses and systems of several lenses have construction-inherent imaging defects which considerably reduce the quality of the image and can thus make subsequent information processing impossible or erroneous. Construction-inherent imaging defects of optical lenses or lens systems are for example spherical aberration, chromatic aberration, color enlargement errors, coma or asymmetry defects, astigmatism, image held curvature, vignetting, distortion or diffraction. It has been possible to largely avoid these imaging defects by the use of lensless imaging methods.

An image created by a pinhole aperture essentially does not have these construction-inherent imaging defects of a lens with the exception of a slight vignetting caused by the geometry which ensures an imaging of the object which is as free as possible of distortion that is the basis for information transfer that is as free of errors as possible. In particular, images based on the pinhole camera principle are characterized by an almost infinite depth of focus.

Another advantage of imaging methods according to the pinhole camera principle is that it enables a simple and cost-effective system to he provided for imaging objects in a compact design which does not require complex and expensive lens systems and enables considerably smaller designs.

However, conventional pinhole camera systems have a system-inherent decrease in brightness towards the edge of the image formed on the detection plane which is also referred to within the scope of the present invention as peripheral decrease in brightness. This system-inherent decrease in brightness towards the periphery of the image is largely due to diffraction phenomena at the pinhole aperture and is particularly perceptible at large viewing angles since it is proportional to the fourth power of the half cosine of the viewing angle. Thus, at a viewing angle of 90° only 25% of the light intensity striking the middle of the image would impinge on the detection plane at the right and left edge of the image ($\cos(90°/2)^4 = 0.25$) which would correspond to a decrease in brightness towards the edges of 2 aperture stops. This system-inherent decrease in brightness towards the periphery of the image has previously prevented a wider use of optical methods according to the pinhole camera principle especially in information-carrying optical systems because there is a large degree of inhomogeneity of the system-inherent brightness distribution depending on the position of the image point relative to the center of the image. As a result these system-inherent brightness effects may be superimposed on the image of the object in the detection plane since, due to the pinhole aperture principle, central areas of the object, are imaged more brightly than peripheral areas. Central areas of the object or image are areas which are near to the optical axis of the imaging system, peripheral areas of the object or the image are areas that are further removed from the optical axis of the imaging system. If an optical pattern and in particular an optical code is not imaged in the detection plane with a substantially uniform system-inherent brightness distribution, it is for example difficult to specify threshold values to differentiate between light or dark areas of the pattern so that it may not be possible to correctly read the information contained in the optical pattern or code.

Methods are known in which a system-inherent brightness distribution in the detection plane that is as homogeneous as possible is achieved by placing optical elements between the object to be imaged and the detection plane which diminish the intensity of the light emitted from the object more strongly in the central areas in comparison to the peripheral areas of the image. DE 4221069 describes such elements. A particular disadvantage of this arrangement is that such optical elements have to be additionally placed in the optical path between the object and detection plane which increases the depth of the structure and the complexity of this imaging system.

It was surprisingly found within the scope of the present invention that the system-inherent imaging defects caused by the use of a pinhole aperture can be substantially compensated by an optical imaging system according to the invention and a substantially uniform system-inherent brightness distribution in the detection plane can be achieved with at the same time a compact design.

The solution according to the invention is to provide a system for optically imaging an object which is located in an object plane comprising a detection device which is located in a detection plane, a pinhole aperture for imaging the object on the detection device and an illumination device for illuminating the object, wherein optical attenuation elements are arranged between the illumination device and the object plane which substantially compensate the imaging defects caused by the pinhole aperture and in particular the system-inherent peripheral decrease in brightness of an image of the object imaged by a pinhole aperture on the detection device. In a typical embodiment, the optical attenuation elements are designed such that they result in a substantially uniform brightness distribution of the image of the object formed on the detection device when imaging a uniform object and in particular a homogeneous surface through the pinhole aperture.

The optical attenuation elements are located according to the invention between the illumination devices and the object plane so that the use of such optical attenuation elements affects the intensity distribution of the illumination of the object. This is in contrast to the systems and methods described in the prior art which describe such attenuation elements between the object and detection plane and in which the illumination of the object is initially substantially homogeneous.

In this connection a particular advantage over the prior art is that these optical attenuation elements do not have to be additionally placed in the optical path between the object and detection plane but can instead be placed between the illumination devices already present and the object plane without increasing the constructional sue of the overall system. In another typical embodiment the optical attenuation elements are designed such that they change the illumination of the object by the illumination device such that the central areas of the object are illuminated at a lower illumination intensity than the peripheral areas of the object.

Surprisingly such an illumination is able to substantially compensate the imaging defects caused by the pinhole aperture and in particular the system-inherent peripheral decrease in brightness of an image of the object formed by a pinhole aperture on the detection device, and a substantially uniform system-inherent brightness distribution is achieved in the detection plane. The optical attenuation elements and their arrangement according to the invention changes the illumination of the object by the illumination device in such a manner that the central areas of the object are illuminated at a lower light intensity than the peripheral areas of the object. As a result of the subsequent imaging of the object illuminated in this manner by the pinhole aperture, the central areas of the object are system-inherently imaged with a higher brightness than the peripheral areas of the object on the detection device. Surprisingly the superimposition of the two effects, the weaker illumination according to the invention of the central areas of the object and the system-inherent imaging of central areas of the object at a higher light intensity by the pinhole aperture can result in a substantially uniform system-inherent brightness distribution of the image of the object to be imaged on the detection device by the imaging system according to the invention. This is the basis for an error-free and reliable evaluation of the optical information of the imaged object.

The compensation according to the invention of the system-inherent imaging defects does not necessarily have to be complete. For many applications it is sufficient to reduce these imaging defects to a certain degree. Thus, for example, in the case of imaging a black-white code on a sensor, it may be sufficient to compensate the system-inherent more light intensive imaging of central areas of the object by the pinhole aperture to such an extent that the superimposition of the system-inherent brightness distribution on the image of the black-white pattern in the detection plane still leads to an image from which the original information can be recorded which in some eases may also involve the use of other methods such as defining threshold values or grey value spreading. The term uniform brightness distribution in the detection plane should be understood in the same sense.

In principle all light sources including natural light sources such as sunlight or daylight can be used as illumination devices within the sense of the present invention. Artificial light sources of a substantially constant brightness such as filament lamps, glow lamps, discharge or induction lamps can be used to ensure that the object to be imaged is illuminated as uniformly and reproducibly as possible. Light emitting diodes can he typically used as illumination devices especially for use in portable systems since they have the advantages of a very small constructed space, a low power consumption, a long life-time with a substantially constant light emission, a high shock resistance and the ability to be operated with direct voltage.

In a typical embodiment, several individual light sources are used as an illumination device which in their entirety act to illuminate the object. If the object is illuminated by several light sources from different spatial directions, the respective light beams from the individual light sources impinging on a point of the object add up to a total light intensity at this point on the object. Such oblique arrangements of several light sources are especially advantageous when importance is attached to the smallest possible constructional depth of the optical system for example in the case of portable systems. Such an oblique arrangement of several light sources at an angle to the optical axis of the system that is not equal to 0° has an additional advantage since it can prevent the imaging of the object from being affected by direct reflections and avoid a shadowing of certain areas of the object especially in the case of three-dimensional objects.

In a typical embodiment, the object is imaged by reflection optical methods. Imaging systems that are based on reflection optical methods are especially suitable for use in portable systems since this enables a very compact design to be achieved. In the case of reflection optical methods, the surface of the object to be imaged is illuminated by illumination devices. The light reflected from the surface of the object is imaged by an imaging system, in the present case by a pinhole aperture, onto a detection device. In contrast to transmission optical methods in which the object is illuminated from the rear side, illumination of the surface of the object enables the illumination devices to be positioned on the side of the object plane which faces the detection plane which thus enables a particularly space saving construction of the imaging system.

In principle all devices can be used as optical attenuation elements in the sense of the present invention which are able to substantially compensate the system-inherent imaging defects caused by the pinhole aperture and in particular the system-inherent peripheral decrease in brightness of an image of the object imaged by a pinhole aperture onto the detection device. In principle all devices can be used as optical attenuation elements in the sense of the present invention which result in a substantially uniform system-inherent brightness distribution in the detection plane.

In another typical embodiment, the optical attenuation elements are in the form of aperture structures which are composed of concentric lines of low transmission and intermediate areas of high transmission, the widths and/or distances between them being designed such that the central areas of the object are illuminated at a lower light intensity than the peripheral areas of the object.

Such aperture structures are described for example in WO 84/00620, WO 84/00620 describes aperture structures made of diffusely light-permeable substrates on the surfaces of which a plurality of light-impermeable concentric circular lines is applied. In order to achieve the desired spatially differentiated light attenuation, the spacing of the equally wide circular lines increases continuously towards the outside so that the outside areas of the aperture structure are more light permeable than the central areas. In another embodiment the spacing of the circular lines is kept constant whereas the width of these circular lines decreases continuously towards the outside so that the outer areas of the aperture structure are more light permeable than the central areas. Of course combinations of circular lines of different widths and different spacing between the respective circular lines are also conceivable which likewise have the effect that the central areas of the object are illuminated at a lower light intensity than the peripheral areas of the object. In addition to such aperture structures which have defined areas of different light permeability, aperture structures can also be used according to the invention which achieve a spatially differentiated light attenuation by the fact that their light permeability changes substantially continuously and in particular increases from the center towards the peripheral areas. This can for example be a circular aperture structure which ahs a center that is only slightly or not light permeable which towards the outside adjoins areas that are more and more light permeable. These areas can merge continuously into one another or be formed as discrete areas. Depending on the wavelength and composition of the light used for illumination, it is possible to also use different color tones in addition to different brightnesses or shades of grey to achieve different light permeabilities. In addition, areas having different light-scattering or reflecting properties, for example transparent and diffusely light-scattering areas, may be suitable for achieving a spatially differentiated fight attenuation. Also combinations of the various embodiments that have been mentioned are possible in order to achieve a spatially differentiated attenuation of the illuminating light.

Such aperture structures according to the invention do not necessarily have to be constructed as concentric circles or be rotational symmetrical. Other geometric arrangements of areas of different light permeability can also be used according to the invention as aperture structures to achieve a spatially differentiated light attenuation. If, for example, the object is not illuminated directly in the optical axis of die system but rather laterally displaced thereto, it may be advantageous to appropriately adapt the aperture structures. This can, for example, be achieved by the fact that the distance and/or the width of light attenuating lines is different in the areas of the aperture structure which face towards the object to be illuminated than in the areas of the aperture structure which away from the object. Thus, in the case of an oblique arrangement of the light source, it is also possible to achieve an illumination of the object according to the invention which is substantially independent of the spatial arrangement of the light source.

The areas of different light permeability of the aperture structures can be manufactured by various technologies known to a person skilled in the art. Such technologies can for example be based on exposure methods photolithographic methods, laser ablation methods, metal laser methods, coating techniques, printing techniques, etching techniques or mechanical machining processes such as punching, drilling or milling.

In addition to such aperture structures it is also possible according to the invention to use optical elements such as lenses or mirrors as optical attenuation elements. Optical filters such as ND filters can also be used according to the invention as optical attenuation elements. Such embodiments are described among others in DE 4221069.

If several individual light sources are used to illuminate the object, it may also be advantageous to use optical attenuation elements that have been optimized accordingly. In yet another typical embodiment the illumination device contains several individual light sources in front of which optical attenuation elements are arranged in such a manner that as a result of the superimposition of the light intensities of the individual light sources in the object plane, the central areas of the object are illuminated at a lower light, intensity than the peripheral areas of the object. Since the individual surface points of the object are at different distances from the individual light sources and their light beams can impinge at different angles, it is nevertheless possible to achieve an illumination of the object according to the invention by modifying the aperture structures while taking into account, the respective illumination situation. Such a design and arrangement of the optical attenuation elements that is optimized with regard to the respective illumination situation can be calculated using geometric and iterative methods known to a person skilled in the art, for example with the aid of computer programs such as ASAP (Breault Research Organization, Tucson, Ariz.) or Trace Pro (Light Tec, Hyeres, France).

In a typical embodiment, the optical attenuation element is in the form of a film mask which has one or more aperture structures. Such film masks on which aperture structures are mounted can be simply and cost-effectively manufactured by exposing a light sensitive film using a template mask which has these aperture structures. These aperture structures can in particular be areas of different brightness and/or different color. Such exposure methods for manufacturing aperture structures are especially suitable for applying very fine and complex aperture structures exactly and cost-effectively onto a film mask. Such technologies and materials also enable large amounts of exactly defined aperture structures to be manufactured cost-effectively such as those that are for example required for use in hand scanners or analytical handheld test systems which, despite large quantities, have to be manufactured in a constantly high and reproducible quality. The exposed and developed films can be used according to the invention as film masks with aperture structures applied thereto as optical attenuation elements. For this purpose such a film mask is placed between one or more light sources and the object to be illuminated in such a manner that the light emitted from the light source or light sources is modified by the aperture structures of the film mask in such a manner that the desired inventive illumination of the object can be achieved and in particular that the central areas of the object are illuminated at a lower light intensity than the peripheral areas of the object as a result of the inventive modification of the illumination intensities of the individual light sources by the aperture structures and the superimposition of such modified illumination intensities of the individual light sources in the object plane. For this purpose individual film masks can be placed in front of each individual light source. However, in another typical embodiment the individual aperture structures are located on a common film mask. Such an embodiment enables the entire aperture system to be assembled in one step in a cost-effective and simple manner.

In principle all devices can be used as detection devices in the sense of the present invention which can temporarily or permanently record the image of the imaged object that is imaged by the pinhole aperture onto the detection plane. They can, for example, be radiation-sensitive films or plates, focussing screens with in-line detectors, line sensors or optical sensor elements such as CCD or CMOS sensors. In a typical embodiment, a CCD element or a CMOS element is used as the detection device. In the case of such optical sensor elements the image of the object can be read directly in the form of data that can be further processed and stored, for further processing or display. Optical sensor elements are particularly suitable for use in portable systems since they enable a very rapid image recording and processing which does not require moving components or process steps or time-consuming and expensive development steps and can be realized in a very compact design.

In principle any apertures can be used as pinhole apertures in the sense of the present invention that are able to form an image of the object to be imaged on the detection plane in a quality that is sufficient for recording and evaluating the optical information contained in the object. In order to ensure that the imaging is as optimal as possible, the parameters aperture diameter and aperture shape and length should be taken into consideration when designing the pinhole aperture. From the imaging principle of the pinhole camera it follows that the image will become sharper as the diameter of the aperture decreases. However, optical diffraction at the edges of the aperture also sets limits on the reduction in the size of the aperture. Since the exposure time is primarily dependent on the aperture size, larger aperture diameters can be used so that the exposure times do not become unnecessarily long. The ideal aperture size depends especially on the image distance (image distance=distance between pinhole aperture and detection plane) and can be calculated accordingly, for example on the basis of the formula: $d=\sqrt{b/500}$ in which d represents the diameter of the aperture and b represents the image distance. The shape of the aperture hole also has an effect on the imaging quality. It is typical to use a circular hole as the aperture shape but other hole shapes such as polygons or slits or combinations of several pinhole apertures such as concentric circles are possible. The length of the hole should ideally be as small as possible to avoid reflections within the aperture channel. Furthermore, short hole lengths can prevent screening effects which would result in the edge areas of the abject being imaged at a lower light intensity.

In one embodiment of the present invention, the pinhole aperture has a diameter of between about 30 and about 1000 μm, typically between about 20 and about 500 μm, more typically between about 50 and about 200 μm. Such small aperture diameters enable a sharp imaging of an object also in the case of short image distances. This is especially advantageous for applications of such imaging systems in portable systems since it enables a good imaging quality to be realized in a very compact design. The pinhole aperture can be manufactured by various methods known to a person skilled in the art. In addition to methods which generate a pinhole aperture by drilling, punching, milling or etching an opening in a substrate, a pinhole aperture can also typically be generated by employing a film mask. In this case a light sensitive film is exposed with a template mask which has a pinhole aperture and subsequently developed such that an image of this pinhole aperture is reproduced on the developed film. This method also enables large quantities of pinhole apertures having very small diameters in the micrometer range to be manufactured reproducibly and cost-effectively with an adequate edge quality. Another advantage of this method is that it is possible to produce very small aperture lengths due to the very small thickness of the photosensitive layer.

In another typical embodiment the pinhole aperture is integrated into a film mask which also has the aperture structures. This is possible when the object is imaged onto the detection plane by reflection optical methods. Thus the aperture structures for attenuating the illuminating light m a spatially differentiated manner as well as the imaging pinhole aperture can be applied in this manner to the film mask in a common process step. This has the additional advantage that the assembly of the optical system can be considerably simplified by such a film mask with combined functions.

Such film masks can be simply, cost-effectively and reproducibly manufactured in large numbers with high precision by exposure using an appropriate template mask.

Systems according to the invention for optically imaging objects can be used particularly advantageously in systems which are used to record and process optical information. Thus a further aspect of the present invention describes systems for recording and processing optical information which comprise an object, which carries optical information especially in the form of optical patterns or codes, a system as described previously for optically imaging the object and an evaluation device which records the optical information of the object from the image of the object on the detector device and provides it for further processing or display.

Systems for recording and processing optical information in the sense of the present invention can be in particular portable or stationary code readers or scanners, but also certain subassemblies in analytical systems in particular in diagnostic test element analytical systems that are used to deliver specific information to the evaluation system on the respective test and/or the special test element. Such systems for recording and processing optical information can also be used in analytical systems which use detection reactions that are evaluated optically, to record and optionally to further evaluate or display the time course or the result of these optical detection reactions. For this purpose the measuring held in which the optically detectable detection reaction takes place can for example be imaged and evaluated by such systems.

Evaluation devices can be all systems known to a person skilled in the art which record optical information of the image of the object on the detection device, optionally convert them into data that can be processed further and can provide these data for further processing or display. Such evaluation devices can be advantageously combined with the detection devices as is for example the case for CCD or CMOS sensors which output digital image data that can already be further processed. The design of such .systems for recording and processing optical information has the advantage that the special arrangement of the optical system enables a compact design of such systems.

Conventional optical reading systems usually employ scan techniques in which the object to be imaged such as a barcode has to be moved relative to the optical system. Line sensors or laser scanners are often used in this case as detection devices which at first only provide one-dimensional image information in the form of a line spectrum. A two-dimensional code pattern can only be subsequently calculated as a result of the movement across the code and the recording of many such one-dimensional line spectra. On the one hand the movement of the object to be imaged relative to the optical system requires a transport mechanism which, in turn requires a larger constructional space and complex and elaborate movement or control devices and, on the other hand, such an additional movement of the object to be imaged relative to the optical system has an effect on the reading reliability of the system. These disadvantages can be overcome by the system according to the present invention for recording optical information which in particular enables optical information of the object to be recorded and processed without a movement of the object to be imaged relative to the optical system.

Optical information is usually coded in the form of various areas of different brightness, light permeability, light scattering, intensity or color and their specific sequence, size or spatial relationship relative to one another stores the information. Optical information is typically coded in one-dimensional or two-dimensional optical patterns or codes—these can for example consist of symbols and typically of letters, numerals, special characters and or patterns and are typically represented in a machine-readable form. In addition to such special codes, changes in color or brightness of a measuring area or measuring field which occur during the course of an analytical detection reaction, or other objects such as two dimensional images or three-dimensional objects can also be regarded as optical patterns within the scope of the present invention. Two-dimensional codes such as, for example, data matrix codes, Aztec codes, Code One codes or Maxi codes can also be used. Such a code can be black-white, black on white or white on black or colored or multicolored and be typically applied to an object by printing it or adhering it to the object. Since 2D codes have an approximately ten-fold higher information density than classical 1D barcodes and can be read almost m any desired direction, they enable the size of the coded pattern to be enlarged with the same surface area of the code which increases the reading reliability of the imaging and information processing system. Thus 2D codes are particularly suitable for an application in analytical systems since they require a very high reading reliability.

Such systems according to the present invention for recording and processing optical information can be used particularly advantageously in analytical systems and in particular in test element analytical systems.

Thus, a further aspect of the present invention describes test element analytical systems comprising test elements which carry optical information and in particular optically encoded information about the type of test, batch number, manufacturing date, cheek sums or for a calibration function, and an evaluation device which contains such a system according to the invention for recording and evaluating the optical information of the test element.

Such test element analytical systems are frequently used in analytical and medical laboratories. The present invention also especially concerns analytical systems in which the analysis is carried out by an appropriately trained person himself, for example by a patient, in order to continuously monitor his state of health (home-monitoring). This is of particular medical importance for monitoring diabetics who have to determine the concentration of glucose in blood several times daily or patients who take anti-coagulant medicaments and therefore have to determine their coagulation status at regular intervals. For such purposes the evaluation instruments should be as light and small as possible, easy to carry, battery operated and robust. Such test, element analytical systems are described for example in DE 43 05 058. The accompanying test elements are often in the form of lest strips which usually consist essentially of an elongate earner layer usually made of a plastic material and a measuring held containing a detection layer that contains the detection reagents and possibly other auxiliary layers such as filtration layers, in addition, test elements can contain coding elements for example in the form of an optical code as additional structures. These can be used to transmit general or specific information about the test elements, such as calibration data or batch information, to the evaluation instrument. In a typical embodiment according to the present invention, such information is stored on the test element in the form of optical patterns or codes and in particular in the form of two-dimensional optical codes, for example as a two-dimensional code printed onto or glued onto one end of the test element. In particular, this enables information to be stored on the test element about the type of test, batch number, manufacturing elates, check sums or data for the calibration function in the form of an optical code. Special coding elements can also be regarded as test elements within the scope of the present invention which can either be introduced into the evaluation instrument or into other evaluation units specially provided for this purpose in analogy to the test elements. Such coding elements can for example be special strips which are for example included in a test strip pack, and can contain information about the type of test, batch number, manufacturing dates, check sums or data for the calibration function and for example only have to be read once per test strip pack.

The evaluation device has a test element holder to position a test element to be evaluated in a measuring position and a measuring device to determine the result of the detection reaction on the test element. In the case of a color change, the measuring device for example contains a reflection photometer to determine the diffuse reflecting power (reflectivity) of the detection layer. Once again it should be noted that the measuring field in which the optically detectable detection reaction takes place can also be imaged and evaluated by the systems, according to the present invention for recording and processing optical information. Also the time course or the result of such an optically detectable detection reaction is regarded as optical information within the scope of the present invention. In the case of electrochemical test elements the measuring device for example contains an appropriate circuit arrangement for measuring current or voltage. The use of the inventive illumination and imaging methods according to the pinhole camera principle enables such test element analytical systems to be realized in a very compact design which is especially advantageous for an application in portable systems. The constructional simple design of the imaging systems according to the invention enables them to be manufactured cheaply and in large quantities since additional optical elements such as lenses are for example not required. In this respect the embodiment according to the invention has considerable advantages over known analytical test element evaluation instruments. Thus, for example, EP 0075223 describes a device for optically detecting a code on a diagnostic test strip in an evaluation device in which the test strip has to be moved relative to the reading device and an additional cylinder lens has to be introduced into the optical path in order to achieve a good illumination and imaging. In contrast, the embodiment according to the present invention has the advantage that neither a movement of the coding area of the test element relative to the optical system nor other moving parts such as hinged mirrors nor an additional lens for an adequate imaging quality are required to ensure a reliable transmission of information. The embodiment according to the present invention enables the information to be transmitted without an additional movement of the test strip so that no special demands have to be made on the uniformity of the test element movement to ensure a reliable transmission and evaluation of the information coded on the test strip. The ability to carry out a static measurement with the illumination and imaging system according to the invention increases the reliability with which optical patterns can be read.

However, analytical systems according to the present invention ate not only limited to test element analytical systems. Other analytical systems such as analytical systems in which a chemical reaction occurs in a test cuvette are also included. In such systems the cuvette can for example be regarded as the test element which can carry an optical pattern or code from which the type of test, batch number, manufacturing dates, check sums or data for the calibration function can be derived and can be read by an evaluation device containing an imaging system according to the instant invention.

The present invention further encompasses methods for optically imaging an object which is located in an object plane onto a detection device which is located in a detection plane where the object is illuminated by an illumination device and the object is imaged onto the detection device by a pinhole aperture and where optical attenuation elements are arranged between the illumination device and the object plane which substantially compensate the imaging defects caused by the pinhole aperture and in particular the system-inherent peripheral decrease in brightness of an image of the object formed by a pinhole aperture on the detection device. In particular, the present invention encompasses those methods in which the optical attenuation elements result in a substantially uniform system-inherent brightness distribution in the detection plane, in particular as a result of the fact that the optical attenuation elements change the illumination of the object by the illumination device in such a manner that the central areas of the object are illuminated at a lower light intensity than the peripheral areas of the object.

The embodiments and further developments previously described in connection with the systems according to the present invention for optically imaging objects, systems for recording and processing optical information and test element analytical systems can also be applied to these methods according to the invention for optically imaging objects.

FIG. 1 shows an exemplary diagram of a system according to the present invention for optically imaging an object. The system for optical imaging 1 enables an object 2 to be imaged onto a detection device 7 by a pinhole aperture 4 which is integrated into a film mask 3. The object plane is the plane in which the surface of the object 2 to be imaged, for example a 2D code, is located and the detection plane is the plane in which the imaging plane of the detection device 7 is located. Both planes are essentially perpendicular to the optical axis of the system which runs from the object 2 perpendicularly through the pinhole aperture 4 to the detection device 7. An image of the object 2 is formed on the detection device 7 by reflection-optical methods in the typical, embodiment shown. For this purpose the surface of the object 2 is illuminated by several illumination devices 6. Optical attenuation elements 5 which in the case shown are designed as aperture structures that are alternately substantially transparent and substantially impermeable to light are located according to the invention between the individual, illumination devices 6 and the object 2 to be illuminated. In the typical embodiment shown the optical attenuation elements 5 are also integrated into the film mask 3. The optical attenuation elements 5 change the illumination of the object 2 by the illumination devices 6 in such a manner that the central areas of the object 2 are illuminated at a lower light intensity than the peripheral areas of the object 2. An optical system window 8 is also shown in FIG. 1. This is located between the film mask 3 and the object 2 to be imaged and can be used to border and define the image section and to define the distance between object 2 and pinhole aperture 4.

Figure 2:
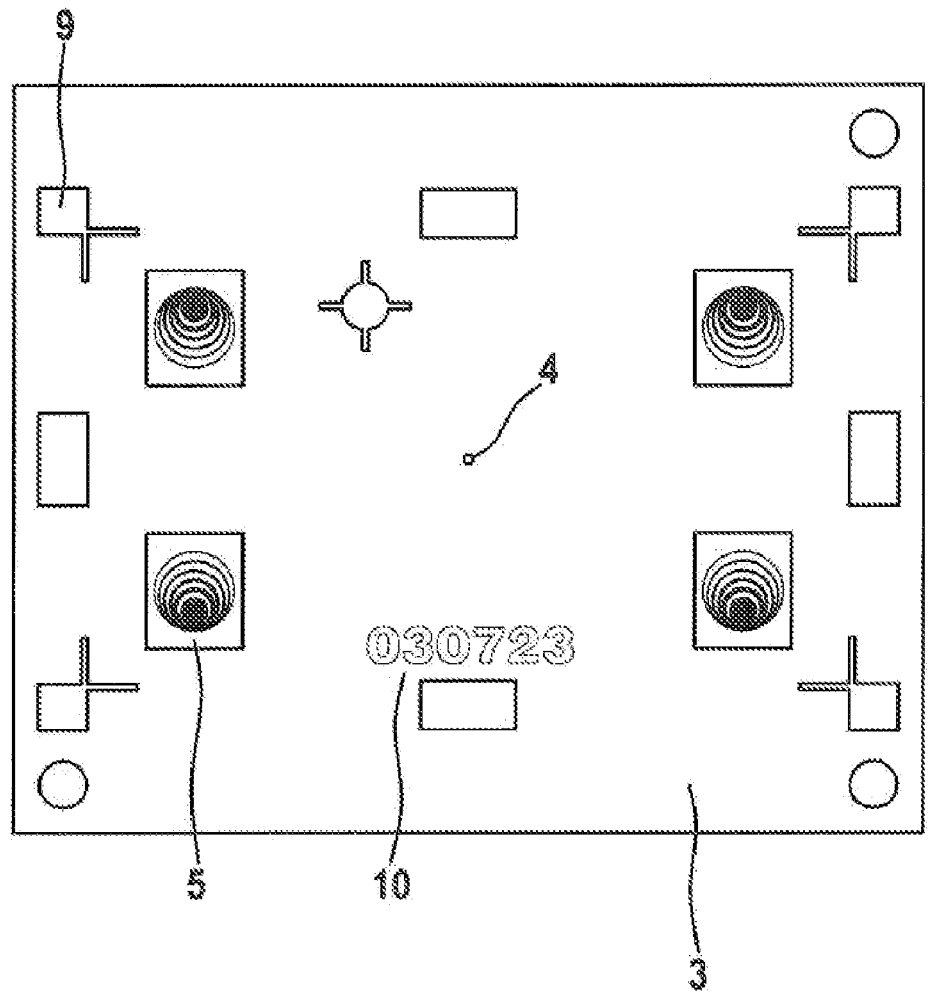
FIG. 2 shows an exemplary embodiment of a film mask according to an embodiment of the invention.

FIG. 2 shows an exemplary embodiment of a film mask according to the invention. The film mask 3 can typically be produced by light exposure using an appropriate template mask and subsequent development of a light-sensitive film material, in the typical embodiment shown the optical attenuation elements 3 which in this case are in the form of aperture structures and also the pinhole aperture 4 are integrated into the film mask, in the case shown four aperture structures located at different positions are applied which each lie in front of an illuminating light source. If several illumination sources are used as in this case to illuminate the object, it is advantageous to design the individual aperture structures such that the central areas of the object are illuminated with a lower light intensity than the peripheral areas of the object due to superimposition of the light intensities of the individual light sources in the object plane, in order to facilitate the positioning of the film mask in the optical system, additional punch marks 9 are applied in the embodiment shown. In order to facilitate an unequivocal identification and characterization of the film mask, additional film marks 10 are applied in the embodiment shown. These can be exposed on the film together with the pinhole aperture and aperture structures and can for example carry information about the shape and size of the pinhole aperture or the shape and the attenuation properties of the aperture structures.

Figure 3:
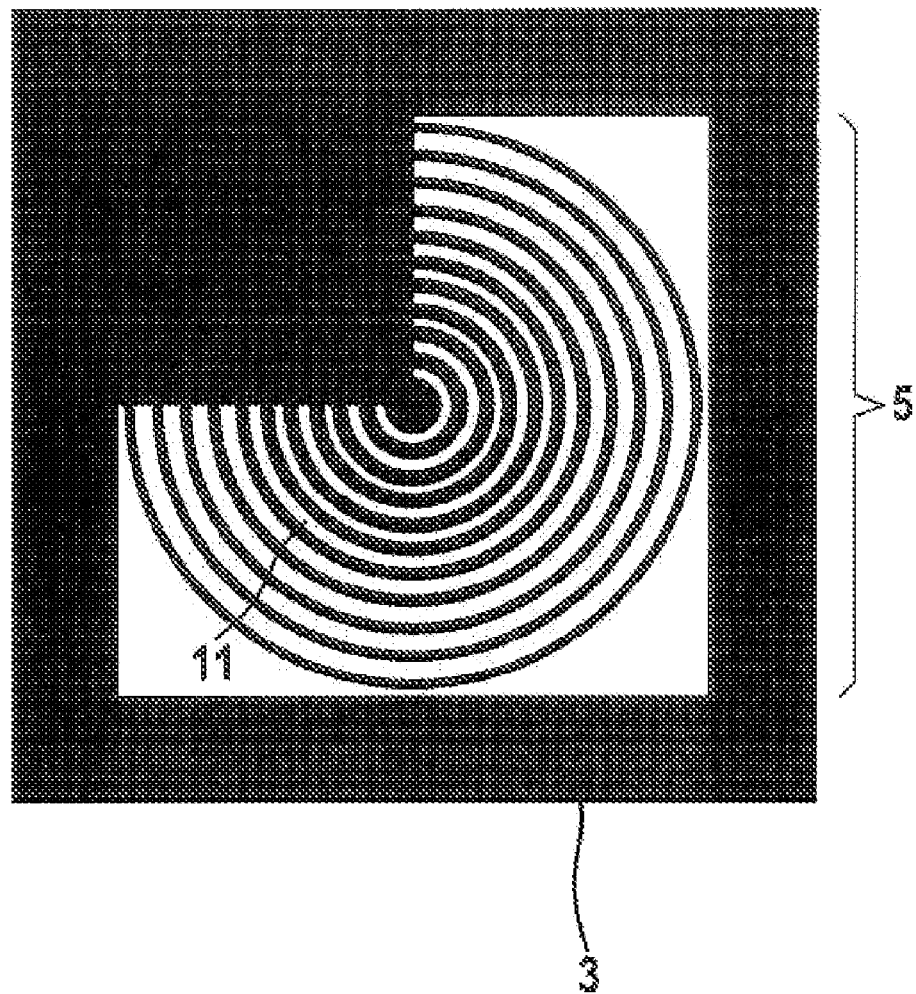
FIG. 3 shows a detailed view of an exemplary embodiment of an aperture structure.

FIG. 3 shows a detailed view of an exemplary embodiment of an aperture structure. The figure shows an embodiment of an aperture structure 11 which was exposed to light on a film mask 3. Such an aperture structure can be used according to the present invention as optical attenuation elements 5. In the embodiment shown the aperture structure consists of concentric lines of low transmission (dark areas) and intermediate areas of high transmission (light areas) whose widths and distances from one another are designed such that the central areas of the object are illuminated at a lower light intensity than the peripheral areas of the object. This embodiment is particularly suitable for the inventive illumination of an object with light sources arranged obliquely to the optical axis. The dark, light-impermeable areas in the left upper area of the aperture structure are in this case directly below the light source and prevent other areas than those near to the object from being illuminated to avoid an indirect scattered light illumination. In the present case the object to be illuminated would be at the bottom on the right. The high ratio of light-impermeable areas to light-permeable areas in the center of the aperture structure in this case results in a relatively low light intensity in the center of the object; the decreasing ratio of light-impermeable areas to light-permeable areas of the aperture structure towards the periphery results in this case in an increasingly stronger light intensity towards the periphery of the object, thus enabling the object to be illuminated according to the present invention.

FIG. 4 shows a view of a system according to the present invention for recording and processing optical information which can for example be integrated into a diagnostic test element analytical system.

FIG. 4a shows a schematic exploded view of such a system which can be used as a component of a diagnostic test element analytical system to record and process information which is stored on the test element.

The system shown contains a test strip holder 13 into which the test element 12 which in this case is in the form of a test strip can be inserted and which serves as a guide and holder for the test element 12. One end of the test element 12 contains the object 2 which is to be imaged by the system which in this case is in the form of a two-dimensional code on the test element 12. The test strip holder 13 is attached to a base plate 15 which can anchor the system in the analytical instrument. In the embodiment shown the test element holder 13 is designed such that the area around the object to be imaged is formed as a so-called strip aperture 17 which defines the area of the object to be imaged. A film mask 3 is located above the object 2 to be imaged which carries a pinhole aperture and the optical attenuation elements that are typically aperture structures. This film mask 3 is mounted on a holder 14 in such a manner that there is a defined spacing between the pinhole aperture and the object plane. A film pressing means 20 is located above the film mask 3 which on the one hand, additionally fixes the film mask 3 and, on the other hand, defines a defined distance between the film mask 3 and the detection plane so that reproducible and defined imaging properties can be achieved. Also the enlargement scale can be defined by the width of the film pressing means 20 and adapted to the respective sensor. The illumination and detection unit 16 is located above the film pressing means which in this case is only shown schematically for the sake of better clarity. This is positioned by the holder 14 in a defined position relative to the film mask 3 and to the object plane.

FIG. 4b shows a detailed diagram of this illumination and detection unit 16 which in this case is shown from the underside for perspective reasons. The illumination and detection unit 16 has a detection device 7 which in this case is typically in the form of a CMOS sensor. This detection device 7 is mounted in a housing 21. In order to protect the detection, device 7 against damages a transparent cover 18 can be optionally placed in front of it. The evaluation devices of the system can as in the example shown of the CMOS sensor, be integrated into it but also be present as separate components and circuits. The connection 19 with which this unit can be connected to the remaining information processing system of the evaluation device is used in this case to supply power to the illumination and detection unit 16 and for data transfer. In the present case the illumination device 6 is composed of four individual LEDs which are obliquely arranged relative to the optical axis of the imaging system. Such oblique arrangements of the illumination sources are especially advantageous when importance is attached to the smallest possible constructional depth of the imaging system.

FIG. 5 shows images of different surfaces recorded by a CMOS sensor which were recorded by an optical system according to an embodiment of the present invention containing appropriate aperture structures as optical attenuation elements. The first column of FIG. 5 shows in each case the image of the film mask used in each case with the corresponding aperture structures, the second column shows the image of a mat polyester surface (Melinex PET polyester film, DuPont) recorded by a CMOS sensor and the third column shows the image of a glossy photopaper recorded by a CMOS sensor. Such homogeneous and in particular uniformly structured and uniformly colored surfaces can be used to gain information about the system-inherent brightness distribution in the detection plane. Such a brightness distribution enables information to be obtained on the system-inherent imaging properties of the optical system.

In each case film masks are used which have 4 aperture structures each consisting of concentric circles of low transmission (dark areas) and intermediate areas of high transmission (light areas) where the ratio of light-impermeable areas to light-permeable areas decreases towards the periphery of the respective aperture structure. In order to improve the illumination situation, the part of the aperture structure located below the light source is additionally darkened.

Figures 5A, 5B, 5C:
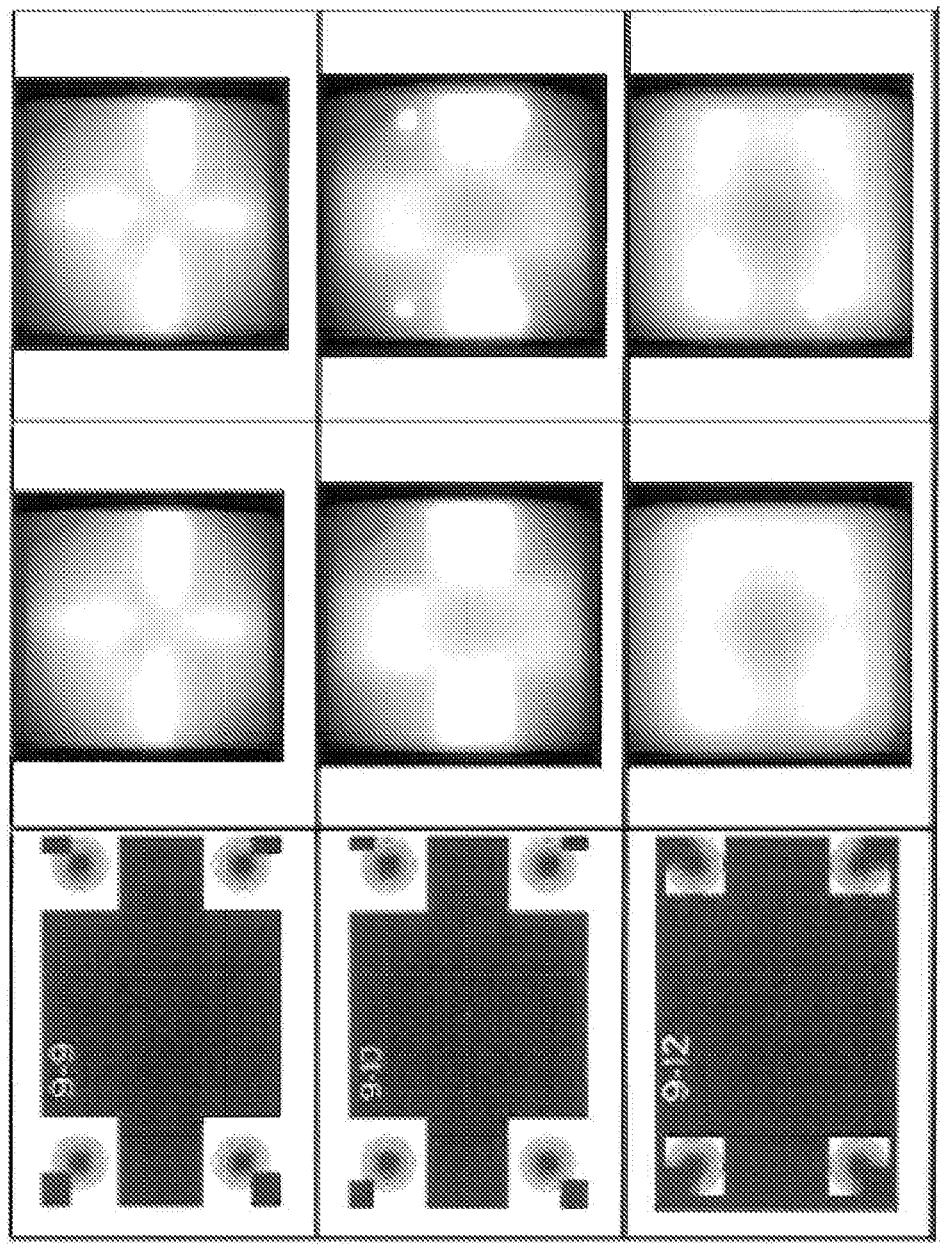
FIGS. 5a-5c show images of different surfaces recorded by means of a CMOS sensor which were recorded by an optical system according to an embodiment of the invention with appropriate aperture structures as optical attenuation elements.

FIG. 5a shows a film mask in which a light-permeable area is additionally arranged around the aperture structure comprising concentric lines. The CMOS recordings of homogeneous surfaces using such film masks show an essentially cross-shape structure with light areas between the illumination devices and dark areas in the corners.

FIG. 5b shows a film mask that is similar to FIG. 5a in which the part of the aperture structure located below the illumination device has been reduced in size. The CMOS recordings of homogeneous surfaces using such film masks also show an essentially cross-like structure in which the light areas are more extensive compared to FIG. 5a.

FIG. 5c shows a film mask in which no additional light-permeable area is present around the aperture structure consisting of concentric lines but rather this area is light-impermeable. The part of the aperture structure located below the illumination device is again arranged centrally. The CMOS recordings using such aperture structures show a much more uniform brightness distribution in the detection plane. Such an aperture structure according to the invention enables the object to be imaged in the detection plane essentially free of system-inherent imaging defects and can thus be the basis for reliable information transfer that is as free of errors as possible.

It is noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A pinhole camera system for optically imaging an object comprising:
   a detection device located in a detection plane;
   a pinhole aperture configured in accordance with a pinhole camera principle to image an object located in an object plane onto the detection device;
   an illumination device for illuminating the object; and
   an optical attenuation element arranged between the illumination device and the object plane, which optical attenuation element is configured to substantially compensate for system-inherent imaging defects caused by the pinhole aperture.

2. The system as claimed in claim 1, wherein the optical attenuation element is configured to substantially compensate for system-inherent peripheral decreases in brightness of an image of the object imaged by the pinhole aperture onto the detection device.

3. The system as claimed in claim 1, wherein the optical attenuation element is configured to provide a substantially uniform, system-inherent brightness distribution in the detection plane.

4. The system as claimed in claim 1, wherein the optical attenuation element is configured to change the illumination of the object by the illumination device such that the central areas of the object are illuminated at a lower illumination intensity than the peripheral areas of the object.

5. The system as claimed in claim 1, wherein the optical attenuation element is configured as an aperture structure which consists of concentric lines of low transmission and intermediate areas of high transmission, their widths and/or spacing between one another being designed such that the central areas of the object are illuminated at a lower light intensity than the peripheral areas of the object.

6. The system as claimed in claim 1, wherein the illumination device contains several individual light sources in front of which optical attenuation elements are arranged in such a manner that as a result of the superimposition of the illumination intensities of the individual light sources in the object plane, the central areas of the object are illuminated at a lower light intensity than the peripheral areas of the object.

7. The system as claimed in claim 1, wherein the optical attenuation element is in the form of a film mask which has one or more aperture structures.

8. The system as claimed in claim 1, wherein the pinhole aperture is in the form of a film mask.

9. The system as claimed in claim 8, wherein the pinhole aperture has a diameter of between about 10 and about 1000 µm.

10. The system as claimed in claim 8, wherein the pinhole aperture has a diameter of between about 20 and about 500 µm.

11. The system as claimed in claim 8, wherein the pinhole aperture has a diameter of between about 50 and about 200 µm.

12. The system as claimed in claim 7, wherein the object is imaged on the detection device by reflection-optical methods and the pinhole aperture is integrated into the film mask.

13. The system as claimed in claim 1, wherein the detection device is an optical sensor element.

14. The system as claimed in claim 13, wherein the optical sensor element is a CCD element or a CMOS element.

15. A system for recording and processing optical information comprising:
an object which carries optical information;
a system for optically imaging an object as claimed in claim 1; and
an evaluation device which records the optical information of the object from the image of the object on the detection device and provides it for further processing or display.

16. The system as claimed in claim 15, wherein the optical information is carried in the form of optical patterns or codes.

17. A test element analytical system comprising:
a test element which carries optical information; and
an evaluation device which contains the system as claimed in claim 15 for recording and evaluating the optical information of the test element.

18. The test element analytical system as claimed in claim 17, wherein the optical information comprises optically coded information about the type of test, batch number, manufacturing dates, check sums or for a calibration function.

19. A method for optically imaging an object comprising:
providing an object located in an object plane;
providing a detection device located in a detection plane;
providing an illumination device;
providing an optical attenuation element arranged between the illumination device and the object plane;
illuminating the object with the illumination device; and
imaging the object onto the detection device by a pinhole aperture configured in accordance with a pinhole camera principle, wherein the optical attenuation element substantially compensates for system-inherent imaging defects caused by the pinhole aperture.

20. The method as claimed in claim 19, wherein the optical attenuation element substantially compensates for system-inherent peripheral decreases in brightness of an image of the object imaged by the pinhole aperture onto the detection device.

21. A pinhole camera system for optically imaging an object comprising:
a detection device located in a detection plane;
a pinhole aperture configured in accordance with a pinhole camera principle to image an object located in an object plane onto the detection device;
an illumination device for illuminating the object; and
an optical attenuation element arranged between the illumination device and the object plane, which optical attenuation element is configured to substantially compensate for system-inherent imaging defects caused by the pinhole aperture, wherein
the optical attenuation element is in the form of a film mask which has one or more aperture structures, and
the object is imaged on the detection device by reflection-optical methods and the pinhole aperture is integrated into the film mask.

* * * * *